United States Patent
Itoh

(10) Patent No.: US 11,922,393 B2
(45) Date of Patent: Mar. 5, 2024

(54) PAYMENT SYSTEM, PAYMENT METHOD, AND NON-TRANSITORY COMPUTER READABLE MEDIUM

(71) Applicant: NEC Platforms, Ltd., Kawasaki (JP)

(72) Inventor: Shuhei Itoh, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 113 days.

(21) Appl. No.: 17/584,611

(22) Filed: Jan. 26, 2022

(65) Prior Publication Data

US 2022/0253820 A1 Aug. 11, 2022

(30) Foreign Application Priority Data

Feb. 8, 2021 (JP) ................................ 2021-018065

(51) Int. Cl.
*G06Q 20/00* (2012.01)
*G06Q 20/20* (2012.01)
*G06Q 50/12* (2012.01)
*G06V 10/74* (2022.01)
*G06V 20/68* (2022.01)

(52) U.S. Cl.
CPC ........... *G06Q 20/208* (2013.01); *G06Q 50/12* (2013.01); *G06V 10/761* (2022.01); *G06V 20/68* (2022.01)

(58) Field of Classification Search
CPC .................................................. G06Q 20/208
See application file for complete search history.

(56) References Cited

U.S. PATENT DOCUMENTS

| 10,706,128 | B2* | 7/2020 | Langheier | G16H 40/63 |
| 11,010,741 | B1* | 5/2021 | Mimassi | G06Q 20/3276 |
| 11,354,760 | B1* | 6/2022 | Dorch | G10L 15/18 |
| 2011/0218839 | A1* | 9/2011 | Shamaiengar | G06Q 30/0641 |
| | | | | 705/7.32 |
| 2013/0054397 | A1* | 2/2013 | Nakatake | G07G 1/0063 |
| | | | | 705/23 |

(Continued)

FOREIGN PATENT DOCUMENTS

JP 2015-064628 A 4/2015
JP 2017-059272 A 3/2017

OTHER PUBLICATIONS

Increasing Customer Awareness on Food Waste at University Cafeteria with a Sensor (Year: 2020).*

(Continued)

*Primary Examiner* — Bruce I Ebersman
(74) *Attorney, Agent, or Firm* — Sughrue Mion, PLLC

(57) ABSTRACT

A payment system includes: an acquisition unit that acquires an image including a payment target product; an estimation unit that estimates a product that corresponds to an object identified from the image; a display unit that displays information on the product in association with the object; a reception unit that receives input indicating intention to register the object, which indicates whether to register the object as the payment target product, from a user; and a registration unit that registers the object in accordance with the input. The registration unit registers the object as the payment target product upon receiving an input indicating that the object should be registered, and does not register the object as the payment target product upon receiving an input indicating that the object should be excluded from the payment target products.

5 Claims, 14 Drawing Sheets

(56) References Cited

U.S. PATENT DOCUMENTS

| | | | |
|---|---|---|---|
| 2013/0336519 A1* | 12/2013 | Connor | G06V 30/142 382/100 |
| 2015/0213429 A1* | 7/2015 | Kanamori | G06Q 20/208 705/23 |
| 2017/0344972 A1* | 11/2017 | Sasaki | G06F 18/2413 |
| 2018/0165728 A1* | 6/2018 | McDonald | G06Q 30/0241 |
| 2018/0204061 A1* | 7/2018 | Antol | G06F 18/24323 |
| 2018/0242908 A1* | 8/2018 | Sazonov | A61B 5/4542 |
| 2019/0156079 A1* | 5/2019 | Espinosa | G06K 7/10366 |
| 2020/0065793 A1* | 2/2020 | Kakino | G07G 1/0063 |
| 2020/0146527 A1* | 5/2020 | Park | D06F 33/00 |
| 2020/0152312 A1* | 5/2020 | Connor | G06V 20/20 |
| 2021/0117954 A1* | 4/2021 | Schwartz | G06Q 30/0619 |
| 2021/0174459 A1* | 6/2021 | Nguyen | G06Q 30/0239 |
| 2021/0186241 A1* | 6/2021 | Kramer | G01G 19/4146 |
| 2021/0377045 A1* | 12/2021 | Doney | G06F 21/62 |
| 2022/0237579 A1* | 7/2022 | Itoh | G07G 1/0036 |
| 2022/0253820 A1* | 8/2022 | Itoh | G06Q 20/208 |
| 2022/0343309 A1* | 10/2022 | Kakino | G07G 1/0054 |
| 2022/0415476 A1* | 12/2022 | Connor | G06V 20/20 |
| 2023/0061377 A1* | 3/2023 | Miyuki | G07G 1/0081 |
| 2023/0108610 A1* | 4/2023 | Tang | G06Q 20/3672 705/66 |
| 2023/0109850 A1* | 4/2023 | Kiet | G06F 16/27 436/20 |
| 2023/0130182 A1* | 4/2023 | Mir | H04L 9/3297 713/189 |
| 2023/0147274 A1* | 5/2023 | Yun | G06V 20/68 382/103 |

OTHER PUBLICATIONS

Based Intelligent Self-Serve Lunch Line (2020 (Year: 2020).*
"Feasability of Using Machine vision Based Cash Register System in a University Cafeteria" (congress on image and signal processing 2010), (Year: 2010).*
Enhancing Food Intake in long term care (Year: 2008).*
Feasibility of using Machine Vision Based Cash Register System in a University Cafeteria (2010) (Year: 2010).*
GECS: Grocery Electronic Card System IEEE 2022 (Year: 2022).*
An Intelligent Self-Service Vending System for Smart Retail, IEEE 2021 (Year: 2021).*
Japanese Office Action for JP Application No. 2021-018065 dated May 10, 2022 with English Translation.
BakeryScan was featured in "Kobe Newspaper" [online], Oct. 29, 2019.
Kikuchi et al., Multi-object recognition technology for recognizing all kinds of retail goods, [online], vol. 72, 2019.
Bread image identification system BakeryScan, "Web Archive of the World, Web Archiving Project of the National Diet Library", [online], Dec. 30, 2020.
Masakazu Morimoto, Image recognition system for food, Development and expansion of bread image recognition cash register, [online], vol. 62 No. 9, 2018, pp. 376-381.

* cited by examiner

161

| PRODUCT IDENTIFICATION CODE | NAME OF PRODUCT | PRICE |
|---|---|---|
| 001 | CHICKEN AND EGG OVER RICE | 800 |
| 002 | MAPO TOFU OVER RICE | 650 |
| 003 | CURRY AND RICE | 550 |
| 004 | HASHED BEEF RICE | 600 |
| 005 | WATER | 0 |
| 006 | CHOPSTICKS | 0 |
| ... | ... | ... |

| PRODUCT IDENTIFICATION CODE | IMAGE | FEATURE POINTS |
|---|---|---|
| 001 | IMAGE A1, IMAGE A2··· | FEATURE POINT 11, FEATURE POINT 12··· |
| 002 | IMAGE B1, IMAGE B2··· | FEATURE POINT 21, FEATURE POINT 22··· |
| 003 | IMAGE C1, IMAGE C2··· | FEATURE POINT 31, FEATURE POINT 32··· |
| 004 | IMAGE D1, IMAGE D2··· | FEATURE POINT 41, FEATURE POINT 42··· |
| 005 | IMAGE E1, IMAGE E2··· | FEATURE POINT 51, FEATURE POINT 52··· |
| 006 | IMAGE F1, IMAGE F2··· | FEATURE POINT 61, FEATURE POINT 62··· |
| ··· | ··· | ··· |

Fig. 10

PAYMENT SYSTEM, PAYMENT METHOD, AND NON-TRANSITORY COMPUTER READABLE MEDIUM

INCORPORATION BY REFERENCE

This application is based upon and claims the benefit of priority from Japanese patent application No. 2021-018065, filed on Feb. 8, 2021, the disclosure of which is incorporated herein in its entirety by reference.

TECHNICAL FIELD

The present disclosure relates to a payment system, a payment method, and a non-transitory computer readable medium.

BACKGROUND ART

Techniques for capturing an image of a tray with food on it, recognizing products from the captured image, and performing a payment process in stores such as canteen facilities have been known.

As related art, for example, Japanese Unexamined Patent Application Publication No. 2017-059272 discloses a product recognition apparatus configured to acquire an image captured by an image capturing unit, cause a display unit to display the acquired image, and receive a selection input to a predetermined part of the image displayed on the display unit. This product recognition apparatus displays a frame border having a fixed size in a position on the image displayed on the display unit where the input has been received, recognizes a product that is present in the frame border from feature amounts of the image in the area surrounded by the frame border, and outputs information on the recognized product. If the product is incorrectly recognized, a user needs to touch a cancellation mark on the screen, erase the displayed frame border, and perform processing of recognizing the image again.

Cases where products may be recognized incorrectly may include, besides a case in which a product put on a tray is incorrectly recognized as another product with a similar appearance, a case in which customer's personal belongings put on the tray are incorrectly recognized as products. When, for example, an object such as a wallet or a smartphone that a customer has is put on the tray, it may be incorrectly recognized as a product and registered as a payment target product. In this case, in a state in which product registration is almost confirmed, the user needs to operate the screen to perform processing for recognizing the product again and needs to erase the object on a payment screen, which requires a complicated operation. In the technique disclosed in Japanese Unexamined Patent Application Publication No. 2017-059272, this problem is not taken into account.

SUMMARY

The present disclosure has been made in view of the aforementioned problem and aims to provide a payment system, a payment method, and a non-transitory computer readable medium capable of easily excluding incorrectly recognized objects from payment targets.

A payment system according to the present disclosure includes:
an acquisition unit configured to acquire an image including a payment target product;
an estimation unit configured to identify an object from the image and estimate a product that corresponds to the identified object;
a display unit configured to display information on the estimated product in association with the object in a product display region;
a reception unit configured to receive input indicating intention to register the object, which indicates whether to register the object as the payment target product, from a user; and
a registration unit configured to register the object as the payment target product in accordance with the input to the reception unit,
in which the registration unit registers the object as the payment target product when the input indicating that the object should be registered as the payment target product has been received in the reception unit, and does not register the object as the payment target product when the input indicating that the object should be excluded from the payment target products has been received in the reception unit.

A payment method according to the present disclosure includes:
an acquiring step of acquiring an image including a payment target product;
an estimating step of identifying an object from the image and estimating a product that corresponds to the identified object;
a display step of displaying information on the estimated product in association with the object in a product display region;
a reception step of receiving the input indicating the intention to register the object, which indicates whether to register the object as the payment target product, from a user; and
a registration step of registering the object as the payment target product in accordance with the input in the reception step, in which
in the registration step, the object is registered as the payment target product when the input indicating that the object should be registered as the payment target product has been received in the reception step, and the object is not registered as the payment target product when the input indicating that the object should be excluded from the payment target products has been received in the reception step.

A non-transitory computer readable medium according to the present disclosure stores a program for causing a computer to execute a payment method including:
an acquiring step of acquiring an image including a payment target product;
an estimating step of identifying an object from the image and estimating a product that corresponds to the identified object;
a display step of displaying information on the estimated product in association with the object in a product display region;
a reception step of receiving the input indicating the intention to register the object, which indicates whether to register the object as the payment target product, from a user; and
a registration step of registering the object as the payment target product in accordance with the input in the reception step, in which
in the registration step, the object is registered as the payment target product when the input indicating that the object should be registered as the payment target product has been received in the reception step, and the object is not registered as the payment target product when the input indicating that the object should be excluded from the payment target products has been received in the reception step.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 9 is a diagram showing a product information database according to the second example embodiment;

FIG. 10 is a diagram showing a feature point information database according to the second example embodiment;

EMBODIMENTS

First Example Embodiment

Hereinafter, with reference to the drawings, example embodiments of the present disclosure will be described.

Figure 1:
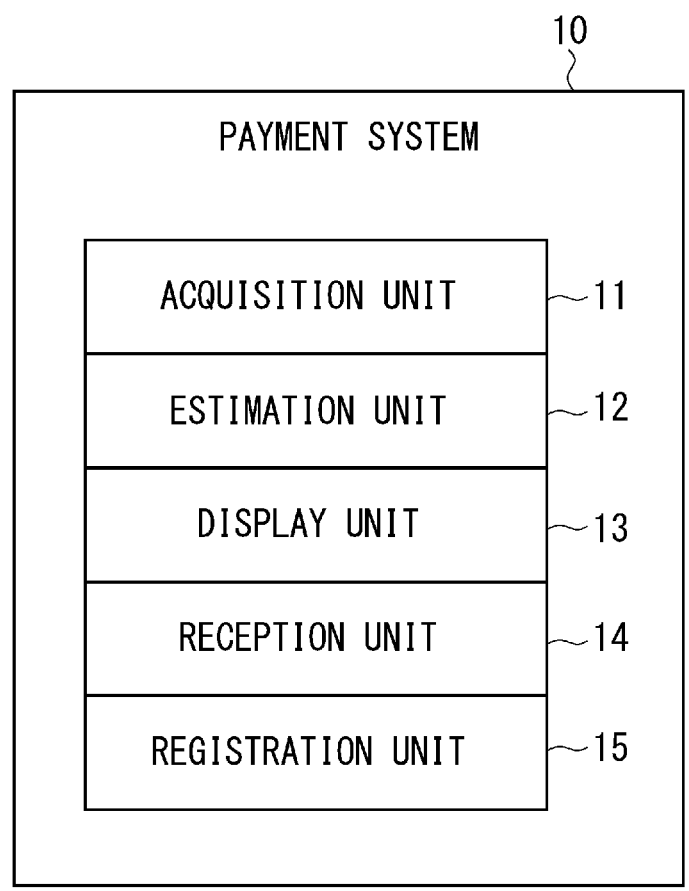
FIG. 1 is a block diagram showing a configuration of a payment system according to a first example embodiment.

FIG. 1 is a block diagram showing a configuration of a payment system 10 according to this example embodiment. The payment system 10 includes an acquisition unit 11, an estimation unit 12, a display unit 13, a reception unit 14, and a registration unit 15.

The acquisition unit 11 acquires an image including a payment target product. The estimation unit 12 identifies an object from the image acquired in the acquisition unit 11 and estimates a product that corresponds to the identified object. The display unit 13 displays information on the product estimated in the estimation unit 12 in association with the object in a product display region. The reception unit 14 receives input indicating intention to register the object, which is information indicating whether to register the object as the payment target product, from a user. The registration unit 15 registers the object as the payment target product in accordance with the input to the reception unit 14.

The registration unit 15 registers an object as a payment target product when input indicating that the object should be registered as the payment target product has been received in the reception unit 14, and does not register the object as the payment target product when input indicating that the object should be excluded from payment target products has been received in the reception unit 14.

The payment system 10 according to this example embodiment identifies an object from the acquired image and estimates a product that corresponds to the identified object. The payment system 10 displays information on the estimated product in association with the object in the product display region. The user checks the content displayed in the product display region and inputs information indicating whether to register the object as the payment target product to the payment system 10. The payment system 10 registers the object as the payment target product in accordance with the input by the user. The payment system 10 registers the object as the payment target product when input indicating that the object should be registered as the payment target product has been received but does not register the object as the payment target product when input indicating that the object should be excluded from the payment target products has been received.

Therefore, with the payment system 10 according to this example embodiment, the user is able to know that an object has been incorrectly recognized by checking the display in the product display region. Further, the user is able to easily exclude incorrectly recognized objects from the payment target products.

Second Example Embodiment

Figure 2:
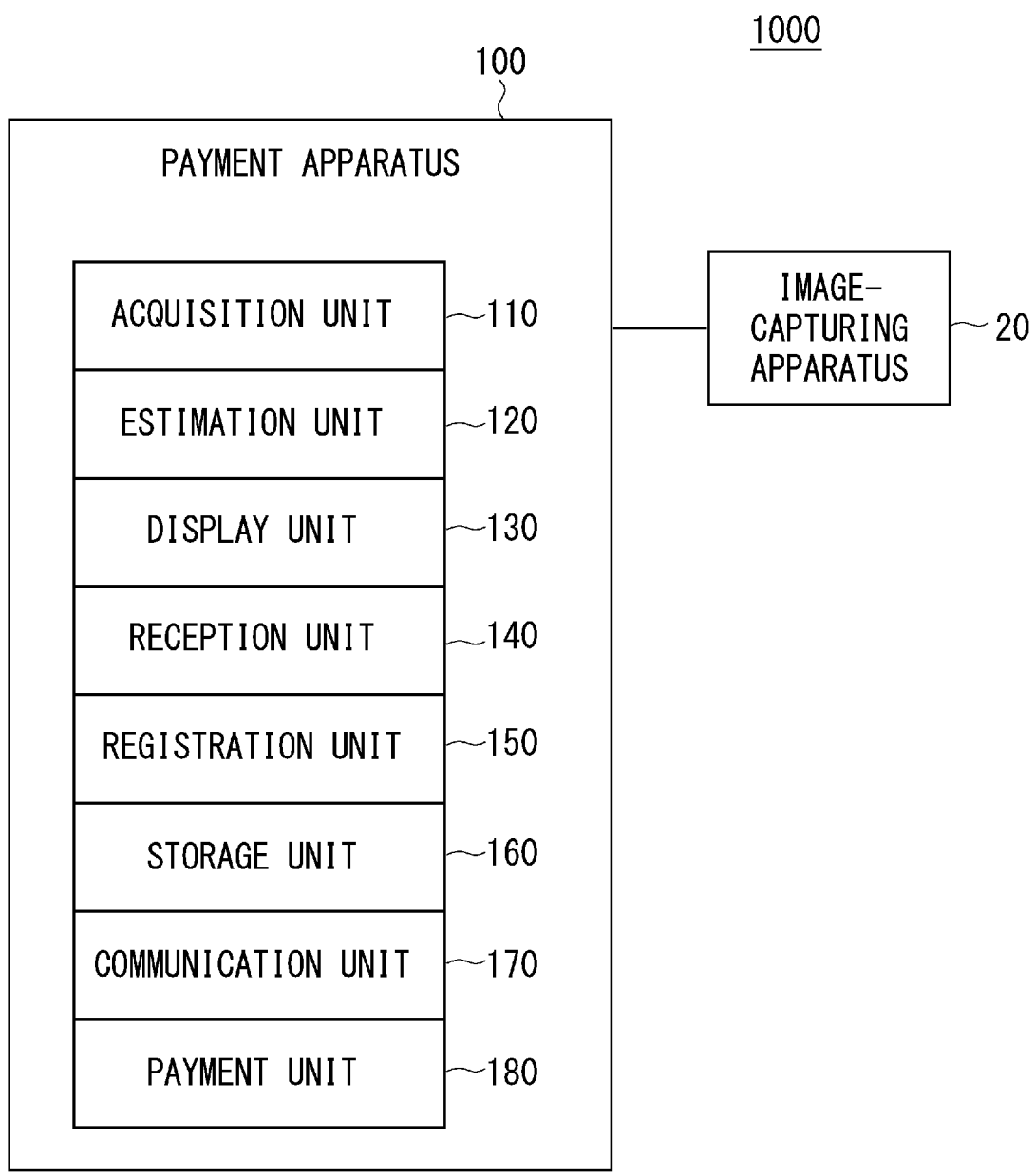
FIG. 2 is a block diagram showing a configuration of a payment system according to a second example embodiment.

A second example embodiment is a specific example of the aforementioned first example embodiment. FIG. 2 is a block diagram showing a configuration of a payment system 1000 according to this example embodiment. The payment system 1000 includes a payment apparatus 100 and an image-capturing apparatus 20. Note that the configuration shown in FIG. 2 is merely one example and the payment system 1000 may be formed using an apparatus or the like in which a plurality of components are integrated. For example, functions of the payment apparatus 100 and the image-capturing apparatus 20 may be integrated in one apparatus. Alternatively, for example, each function unit in the payment apparatus 100 may be processed in a distributed manner using a plurality of apparatuses or the like.

The payment system 1000 is used in a canteen facility or the like in the form of cafeteria where customers who use the store put desired products on the respective trays and make a collective payment after choosing the products. The store may include, for example, a company canteen, a restaurant, a hotel, various types of self-service eateries, etc.

Figure 3:
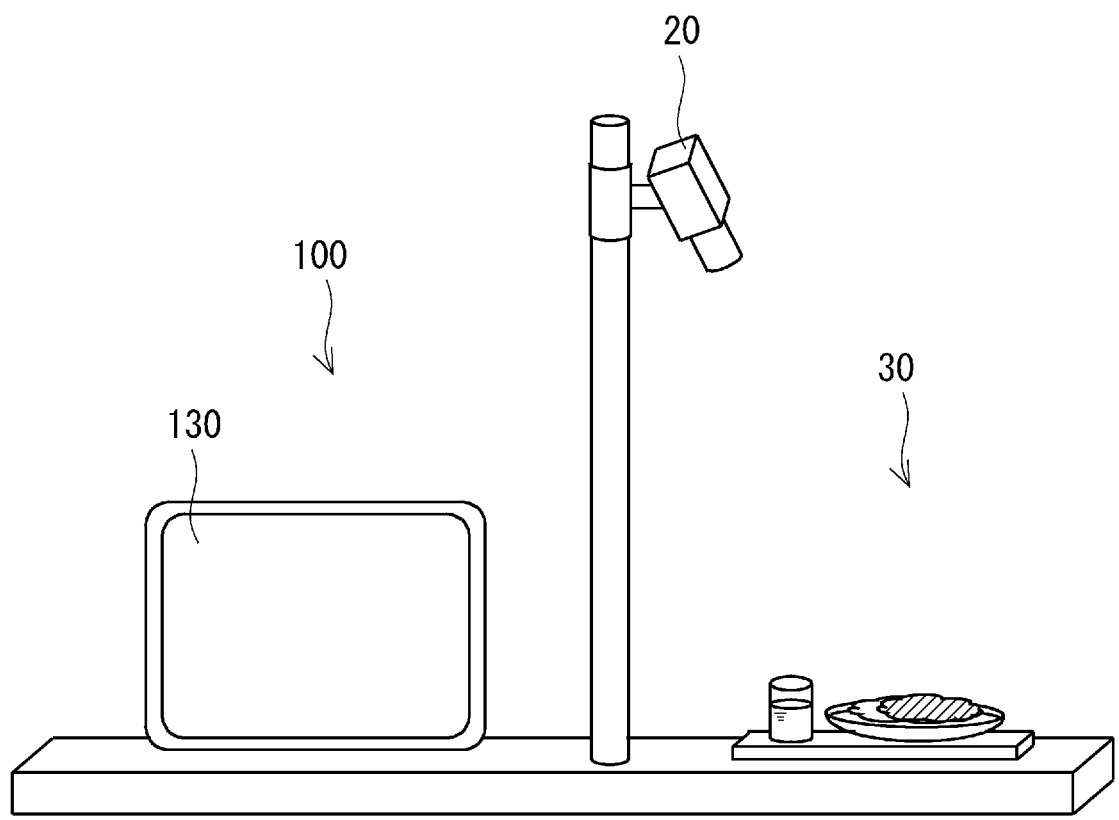
FIG. 3 is a diagram showing an outline of the payment system according to the second example embodiment.

FIG. 3 is a diagram showing an outline of the payment system 1000. A customer selects desired products from the menu in the store and puts the selected products on a predetermined tray. The customer himself/herself may take these products from shelves or may receive them from a cook in the store. Further, the customer may put chopsticks, spoons, wet wipes, or water supplied by an automatic water supply machine or the like on the tray with the products.

After putting desired products and the like on the tray, the customer moves to the position of the payment apparatus 100 to make payment. It is assumed, in this example, that curry and rice and water are put on the tray, which are collectively referred to as a product group 30 in the following description. It is further assumed that curry and rice is provided for a fee and water is provided free of charge.

When the customer moves to the position of the payment apparatus 100, the cashier in the store performs processing of paying for the product group 30 using the payment apparatus 100. The image-capturing apparatus 20 is provided in the vicinity of the payment apparatus 100. The image-capturing apparatus 20 captures an image of the product group 30 from above and acquires the image including curry and rice and water. The image-capturing apparatus 20 transmits the acquired image to the payment apparatus 100.

The payment apparatus 100 includes a display unit 130 that displays the image of the product group 30 and information regarding payment processing. The display unit 130 may be, for example, a touch panel (a touch operation screen) that allows the cashier to operate the payment apparatus 100 by touching it with his/her finger or the like. The cashier checks the content displayed on the display unit 130, performs predetermined confirmation processing, and then performs payment processing.

Referring once again to FIG. 2, the explanation will be continued. The image-capturing apparatus 20 captures the image of the product group 30 put on the tray, acquires image data, and transmits the image data to the payment apparatus 100. The image-capturing apparatus 20 may be, for example, a camera that captures the image of the product group 30 to acquire two-dimensional image data and transmits the acquired two-dimensional image data to the payment apparatus 100. The image to be captured may either be a still image or a moving image. The image-capturing apparatus 20 is provided in the vicinity of the payment apparatus 100 in such a way that the product group 30 is included in an image-capturing range. For example, the image-capturing apparatus 20 captures the image of the product group 30 from above.

Next, the payment apparatus 100 will be described. The payment apparatus 100 constitutes the payment system 10 according to the first example embodiment in the narrow sense. The payment apparatus 100 includes an acquisition unit 110, an estimation unit 120, a display unit 130, a reception unit 140, a registration unit 150, a storage unit 160, a communication unit 170, and a payment unit 180.

The acquisition unit 110 corresponds to the acquisition unit 11 according to the first example embodiment. The acquisition unit 110 acquires an image including payment target products from the image-capturing apparatus 20 and outputs the acquired image to the estimation unit 120.

The payment target products are products that are subject to payment made by customers. The payment target products are, for example, products included in a product menu that the store prepares in advance. In this example, curry and rice is included in the payment target products. The payment target products may include not only cooked products but also commercial products such as snacks or beverages sold in the store. While the payment target products are typically fee-charging products, this is merely one example. When, for example, a product normally sold as a fee-charging product is provided free of charge for a predetermined period of time, this product may be included as a payment target product.

The image that the acquisition unit 110 acquires from the image-capturing apparatus 20 may include payment non-target products as well as payment target products. The payment non-target products are products that are not subject to payment made by customers. The payment non-target products may be free products that are assumed by the store to be included in the image captured using the image-capturing apparatus 20. The payment non-target products may be, for example, chopsticks, spoons, wet wipes, water supplied by an automatic water supply machine or the like. The payment non-target products may be estimated as being products that correspond to the objects identified from the acquired image in the estimation unit 120 that will be described later. In this example, water is included in the payment non-target products.

Further, images that the acquisition unit 110 acquires from the image-capturing apparatus 20 may include items that correspond to neither the payment target products nor the payment non-target products (hereinafter they are referred to as "excluded items"). The excluded items may be objects that are not assumed by the store to be included in the image captured using the image-capturing apparatus 20. The excluded items may include, for example, the wallet, the mobile telephone, the smartphone, the portable music player, the memo pad, the handkerchief or the like of a customer. The excluded items are not limited to them and may include anything. The excluded items are not estimated as the products that correspond to the objects identified from the acquired image in the estimation unit 120 that will be described later.

The estimation unit 120 corresponds to the estimation unit 12 according to the first example embodiment. The estimation unit 120 identifies an object from the image and estimates the product that corresponds to the identified object. The estimation unit 120 may identify a plurality of objects from the image and estimate a plurality of products that correspond to the plurality of respective objects that have been identified. The estimation unit 120 acquires an image from the acquisition unit 110 and identifies objects included in the acquired image using image recognition or the like. In this example, the estimation unit 120 identifies curry and rice and water as objects.

The estimation unit 120 refers to feature point information database 162 stored in the storage unit 160 and estimates the respective products that correspond to these identified objects. The feature point information database 162 stores product identification information for identifying products in association with feature points of the products.

Figure 4:
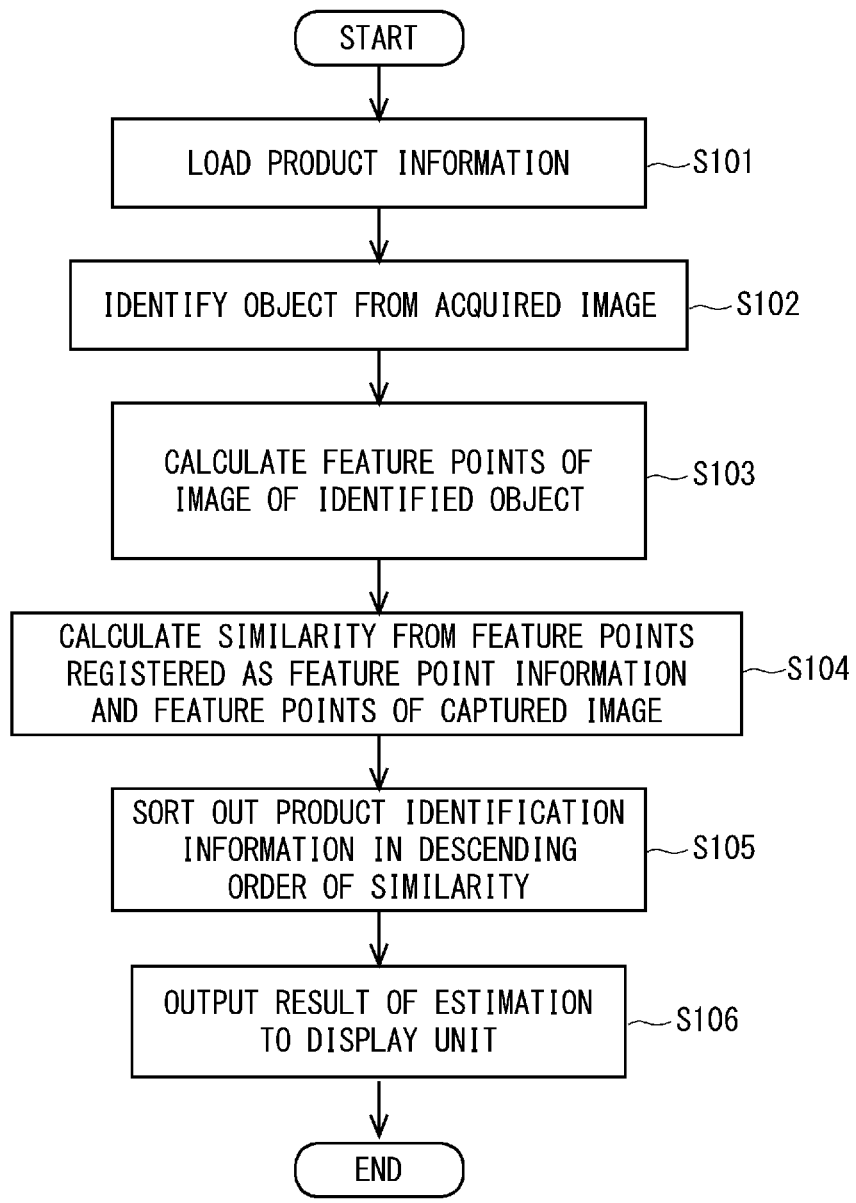
FIG. 4 is a flowchart showing estimation processing according to the second example embodiment.

FIG. 4 is a flowchart showing estimation processing performed by the estimation unit 120. The estimation unit 120 refers to a product information database 161 in the storage unit 160 and loads product information (S101). The product information database 161 stores product identification information for identifying a product in association with information about the product, including the name and the price of the product. The estimation unit 120 identifies an object included in an image from the image acquired in the acquisition unit 110 (S102). The estimation unit 120 calculates feature points of the image of the identified object (S103).

The estimation unit 120 refers to the feature point information database 162. The estimation unit 120 compares feature points registered in the feature point information database 162 with feature points of the image of the identified object and calculates the similarity between them (S104). The processing of calculating the similarity may be performed on all the plurality of products stored in the feature point information database 162 or may be performed on some of them.

The estimation unit 120 sorts out product identification information in descending order of calculated similarity (S105). The estimation unit 120 generates a product candidate list based on the results of sorting and outputs the product candidate list to the display unit 130 as the result of the estimation (S106).

Referring once again to FIG. 2, the explanation will be continued. The display unit 130 corresponds to the display unit 13 according to the first example embodiment. The display unit 130 receives the result of the estimation from the estimation unit 120 and displays the information on the estimated product in association with the object in the product display region. When a plurality of products have been estimated in the estimation unit 120, the display unit 130 displays information on the plurality of products that have been estimated in association with a plurality of objects in the product display region.

The display unit 130 may include, for example, a liquid crystal display, an organic EL display or the like. The display unit 130 may be a touch panel that allows the user to operate the payment apparatus 100 by touching it with his/her finger or the like. It is assumed here that the display unit 130 is a touch panel that includes functions of the reception unit 140 that will be described later. It is further assumed, in this example embodiment, that the user is the cashier in the store.

Figure 5:
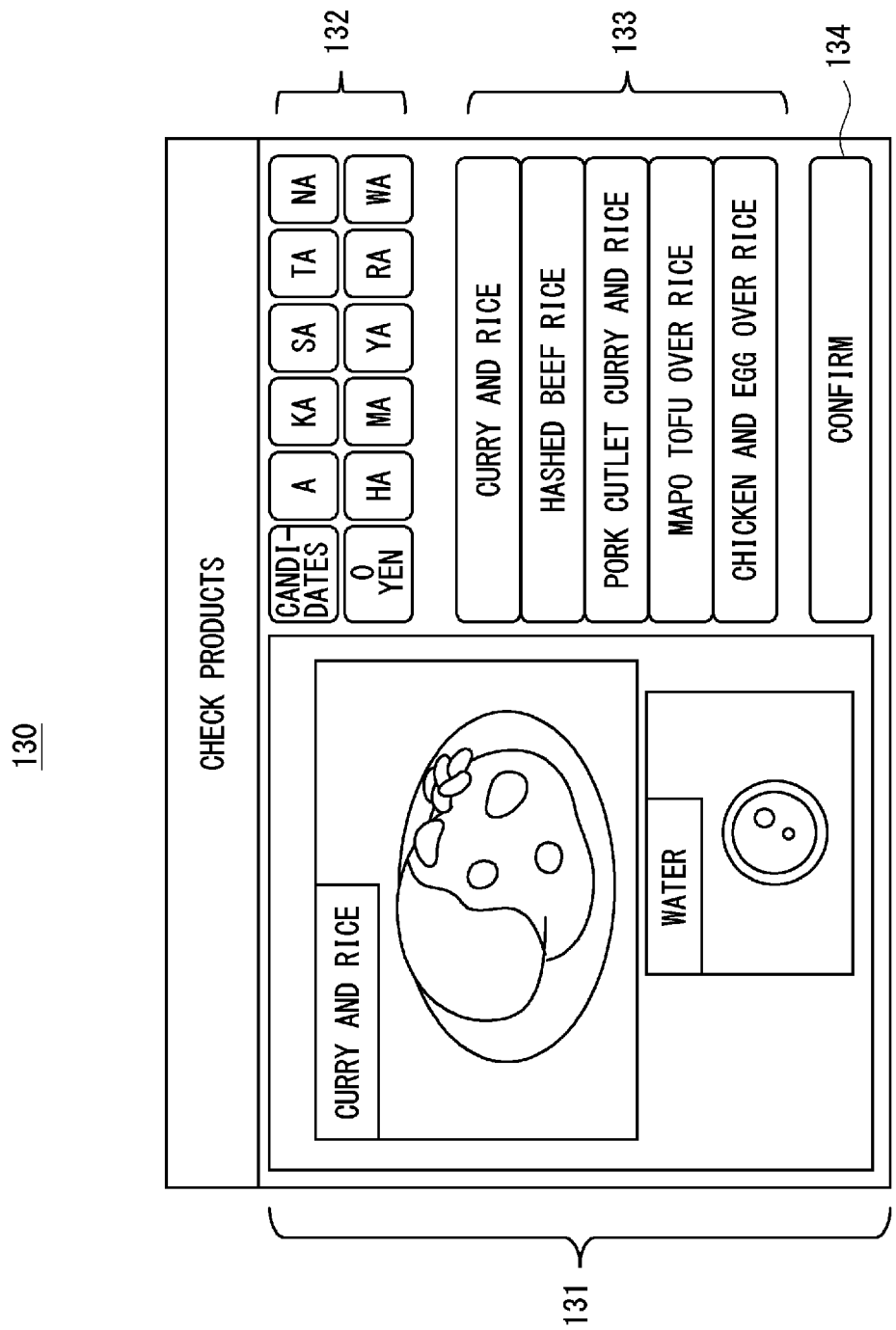
FIG. 5 is a diagram showing a display screen when a correct estimation result has been obtained in the second example embodiment.

FIG. 5 is a diagram showing one example of a display screen displayed by the display unit 130. The display unit 130 displays a product display region 131, index buttons 132, a product candidate list 133, and a confirmation button 134 on the same screen. Further, not all of them need to be displayed on the same screen. The display unit 130 may receive the touch operation by the user and switch whether or not to display the display region and so on as appropriate.

Further, the display unit 130 may further display, besides the above content, various display regions or operation buttons. For example, the display unit 130 may display the price of a payment target product in association with the image of the product. When there are a plurality of products, the display unit 130 may display the total amount of the plurality of products. Further, the display unit 130 may be provided not only on a cashier side but also on a customer side. According to this configuration, both the casher and the customer can confirm the payment target products, the payment amount and so on.

The product display region 131 is a region that displays information on the estimated product in association with the recognized object. In this example, the product display region 131 displays the name of the estimated product in association with the image of the recognized object. In the product display region 131, the image of the recognized object may be displayed while the positional relation among objects in the image acquired in the acquisition unit 110 is maintained. According to this configuration, the cashier is able to easily compare the image displayed in the product display region 131 with the dishes on the tray. Therefore, when there is an error in the content displayed in the product display region 131, the cashier is able to easily find the error. Further, the cashier is able to intuitively perform the operation of touching the display unit 130.

In the example shown in FIG. 5, curry and rice and water put on the tray are correctly estimated by the estimation unit 120. The product display region 131 displays the names of the products, which are information on the respective products, in association with the recognized images. Besides the names of the products, information such as the prices of the respective products and the like may be displayed in the product display region 131.

The index buttons 132 are buttons for extracting a product by using the first letter of the name of the product when the product is selected. The product candidate list 133 is a region for displaying the product candidate list acquired from the estimation unit 120. In FIG. 5, results estimated from the image of curry and rice are shown in descending order of similarity. The product candidate list 133 includes buttons for selecting each candidate product. When the estimated product is incorrect, the user is able to reselect the correct product by pressing the button of each product. When, for example, the product on the tray is hashed beef rice, not curry and rice, the user is able to select the correct product by pressing the button "hashed beef rice" in the product candidate list 133.

The confirmation button 134 is a button for confirming the product registration. The user inputs his/her intention to register each of the recognized objects as the payment target product by pressing the confirmation button 134. In this example, the cashier inputs his/her intention to register curry and rice as the payment target product by pressing the confirmation button 134. When there are a plurality of products, the cashier may input information indicating that a plurality of products should be collectively registered as payment target products by pressing the confirmation button 134 after confirming that the estimation of all the products is correct. Alternatively, the cashier may separately input each of the products. For example, when the cashier touches the image of curry and rice, the "register" button may be displayed. Then, the cashier may input his/her intension to register curry and rice as a product by clicking the "register" button. After the cashier finishes registering all the payment target products, the process proceeds to payment processing.

Figure 6:
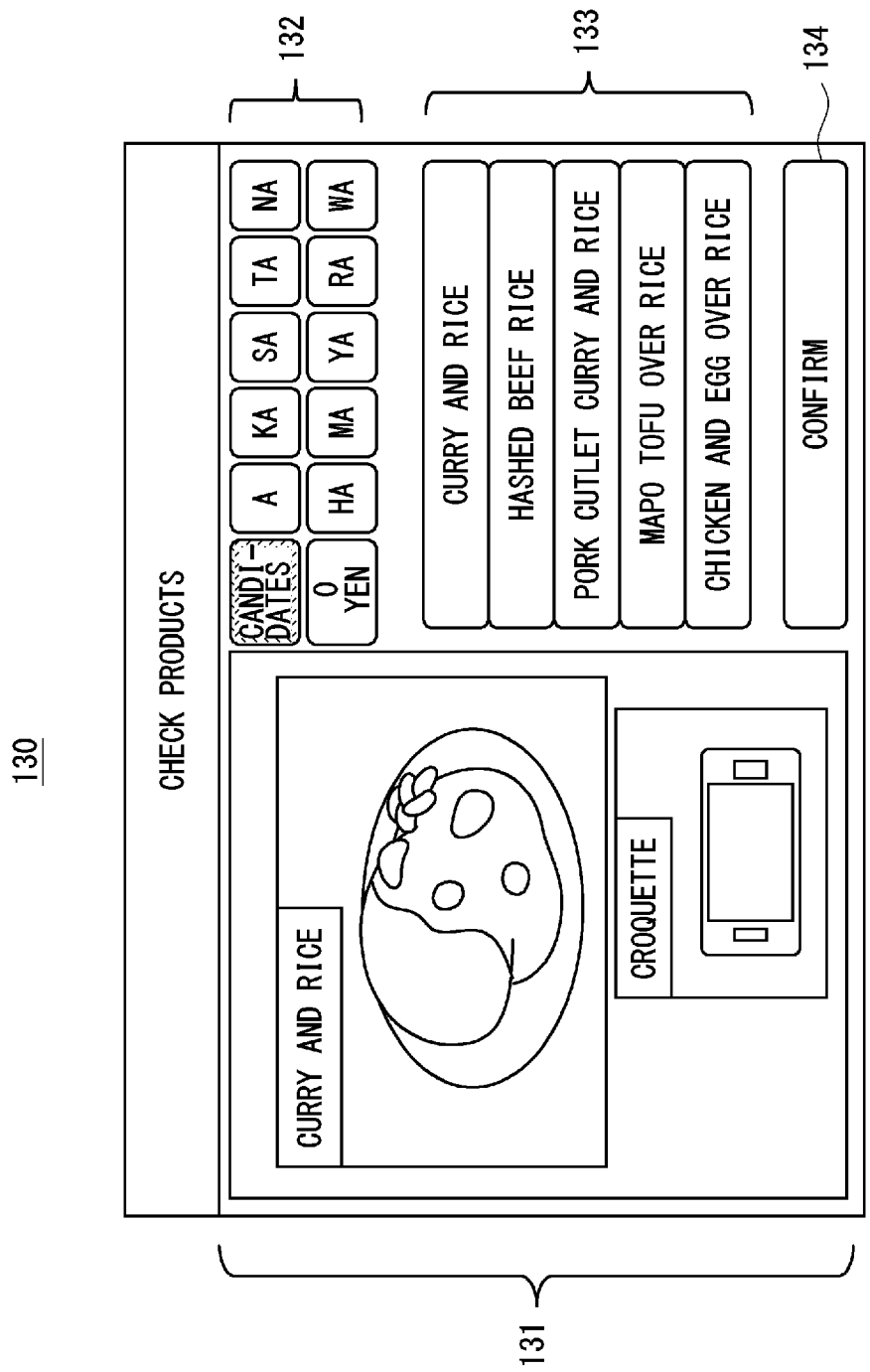
FIG. 6 is a diagram showing a display screen when an incorrect estimation result has been obtained in the second example embodiment.

Now, with reference to FIG. 6, a case in which an excluded item on the tray has been incorrectly estimated as a product will be described. In FIG. 6, a smartphone that the customer has put on the tray is estimated as a croquette. In this case, the cashier needs to exclude the smartphone estimated as a croquette from the payment targets to confirm product registration.

Figure 7:
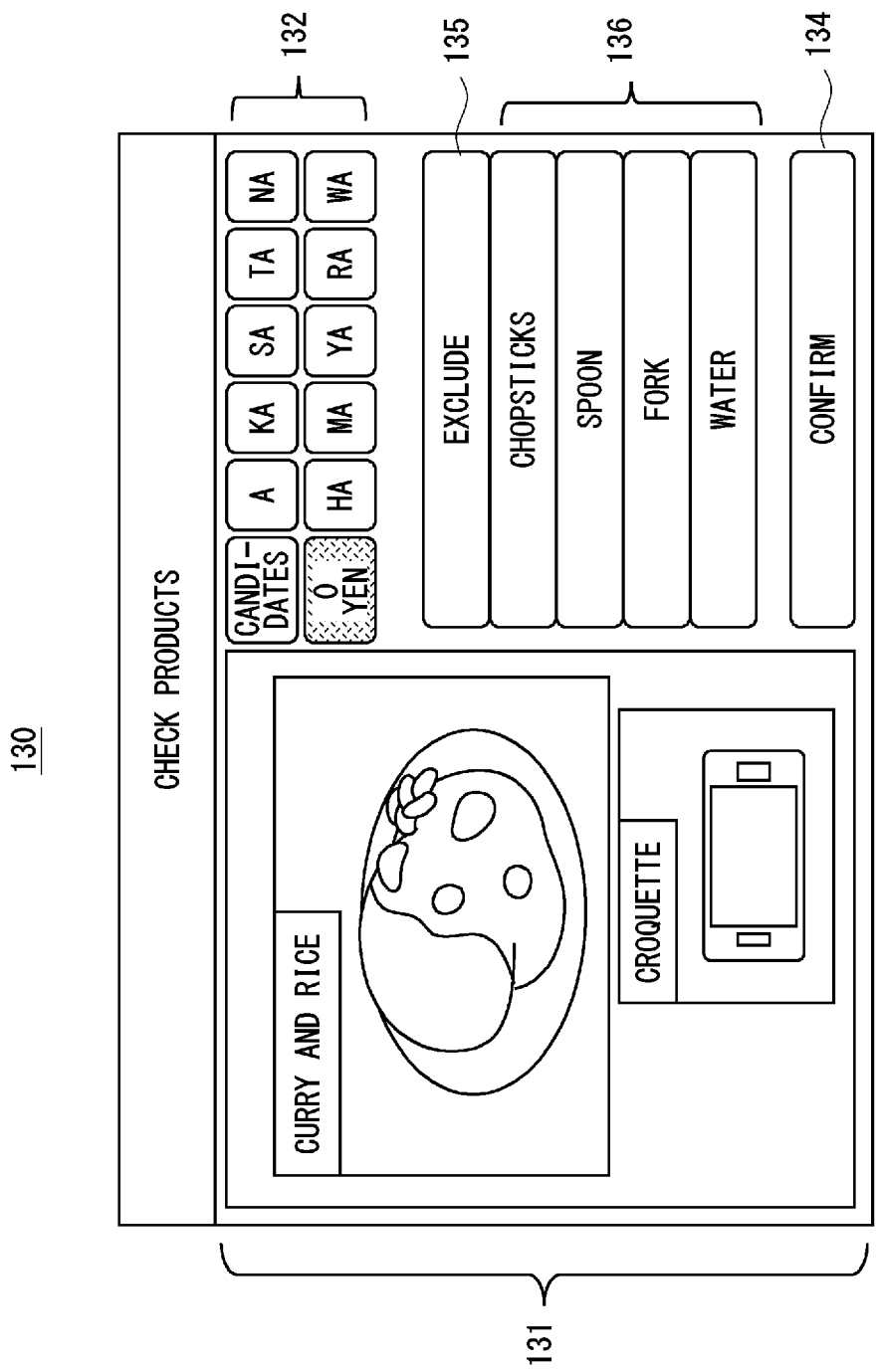
FIG. 7 is a diagram showing a display screen including a payment non-target product list according to the second example embodiment.

FIG. 7 shows one example of a screen when a "0 yen" button in the index buttons 132 is pressed. As shown in FIG. 7, when the user presses the "0 yen" button (first touch operation), the display unit 130 displays the product display region 131, a payment non-target product list 136, and an exclusion button 135 on the same screen. The payment non-target product list 136 functions as a payment non-target product display region which displays information on payment non-target products that may be estimated as products in the estimation unit 120. In this example, chopsticks, spoons, forks, and water are displayed in the payment non-target product list 136. The cashier checks the content of the payment non-target product list 136 and confirms that there is no smartphone in the list.

The exclusion button 135 functions as an input region for the user to input information indicating that an object should be excluded from the payment target products. When the user inputs information that an object should be excluded, the cashier first selects the smartphone by touching, for example, the part of the image of the smartphone that is estimated to be a croquette. Then, the cashier performs an operation of excluding the smartphone from the payment target products by pressing the exclusion button 135 (second touch operation).

Figure 8:
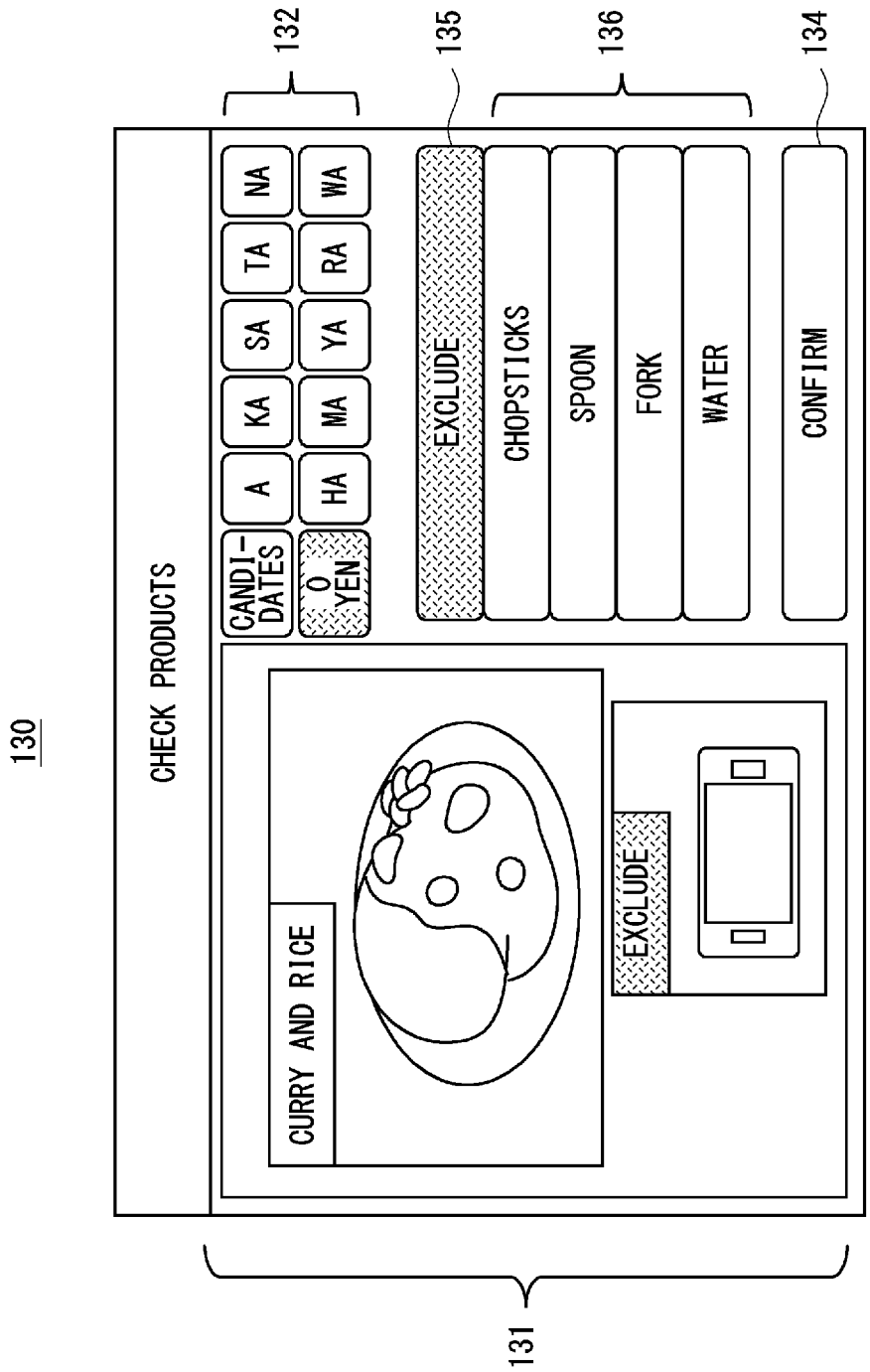
FIG. 8 is a diagram showing a display screen when an exclusion button has been pressed in the second example embodiment.

FIG. 8 shows one example of a screen after the exclusion operation is performed regarding the smartphone. As shown in FIG. 8, when the user has performed the input indicating that the object should be excluded in the product display region 131, the display unit 130 displays information indicating that this object has been excluded from the payment target products in proximity to the image of this object. In FIG. 8, "croquette" displayed in proximity to the image of the smartphone is changed to "exclude". According to this configuration, the cashier can easily confirm that the excluded item has been excluded from the payment target products. The display unit 130 may display the image of the object that has been excluded in such a way that it can be distinguished from payment target products. For example, the display unit 130 may display the image of the object that has been excluded in gray.

Further, the exclusion button 135 may be displayed so as to be superimposed on the image of the selected object in the product display region 131. According to this configuration, it is possible to prevent wrong buttons from being pressed. Further, since the cashier does not need to move his/her finger to a distant position on the screen, the cashier is able to input information that the selected object should be excluded in a shorter period of time.

When, for example, the similarity between the object identified from the image acquired in the acquisition unit 110 and the product estimated in the estimation unit 120 is low, the phrase "confirmation required" or the like may be displayed to alert the cashier. Further, the display unit 130 may cause these products or objects that are highly likely to be incorrectly recognized to be pre-selected on the screen. According to this configuration, the cashier is able to proceed the payment processing with fewer touch operations.

While the input to exclude items has been performed by first pressing the "0 yen" button in the index buttons 132 and then pressing the exclusion button 135 in the aforementioned description, this is merely one example. The display unit 130 may display the product display region 131 and the exclusion button 135 on the same screen from the beginning. For example, the display unit 130 may constantly display the exclusion button 135 or display the exclusion button 135 in a predetermined place when an object has been selected in the product display region 131. The predetermined place is not limited to the place shown in FIG. 8 and may be a place of the product display region 131 that is in proximity to the image of the object or may be a region that overlaps the image of the object.

Further, the input to exclude items may not be necessarily performed by pressing the exclusion button 135 in the display unit 130. Alternatively, the input to exclude items may be performed by long pressing, double tapping, or swiping the image of an object to be excluded in the display unit 130. In this case, the display unit 130 may display a confirmation message such as "Do you want to exclude this object?" to prevent operation errors.

Referring once again to FIG. 2, the explanation will be continued. The reception unit 140 corresponds to the reception unit 14 according to the first example embodiment. The reception unit 140 receives the input indicating the intention to register the object, which is information indicating whether to register the object as the payment target product, from the user. Further, when a plurality of objects have been recognized in the estimation unit 120, the reception unit 140 receives the input indicating the intention to register each of the plurality of objects from the user. The reception unit 140 receives the input indicating the intention to register the product in accordance with the touch operation that the cashier performs with the display unit 130. The reception unit 140 receives the input to exclude an incorrectly recognized object from the payment target products in accordance with the touch operation by the cashier.

The registration unit 150 corresponds to the registration unit 15 according to the first example embodiment. The registration unit 150 registers an object as the payment target product in accordance with the input to the reception unit 140. The registration unit 150 registers the object as the payment target product when the input indicating that the object should be registered as the payment target product has been received in the reception unit 140. The registration unit 150 does not register the object as the payment target product when the input indicating that the object should be excluded from the payment target products has been received in the reception unit 140.

Further, when a plurality of objects have been recognized in the estimation unit 120, the registration unit 150 registers each of the plurality of objects as the payment target product in accordance with the input to the reception unit 140. The registration unit 150 registers, as the payment target product, one of the plurality of objects regarding which input indicating that this object should be registered as the payment target product has been received in the reception unit 140. The registration unit 150 does not register, as the payment target product, one of the plurality of objects regarding which input indicating that this object should be excluded from the payment target products has been received in the reception unit 140.

The storage unit 160 stores product information. FIG. 9 is a diagram showing one example of the product information stored in the storage unit 160. The product information may include, for example, product identification information for identifying the product, the name of the product, the price of the product etc. In this example, a product identification code set in advance in the store is used as the product identification information. Various kinds of codes such as a Price Look Up (PLU) code or a Japanese Article Number (JAN) code may be used, for example, as the product identification code. Further, the product information may include various kinds of information regarding products. The storage unit 160 stores the product identification code in association with information such as the name or the price of the product as the product information database 161.

Further, the storage unit 160 stores feature point information of products. FIG. 10 is a diagram showing one example of feature point information stored in the storage unit 160. The feature point information is information regarding feature points of each product calculated from the image of each product based on predetermined calculations. The storage unit 160 stores the product identification code in association with the feature points of each product calculated using a plurality of images of the respective products as the feature point information database 162.

As described above, in this example embodiment, when an excluded item such as a smartphone is incorrectly estimated as a product, the user can easily input information indicating that this item should be excluded from the payment target products. Therefore, the storage unit 160 does not need to store information on the excluded items in the product information database 161 and the feature point information database 162.

Referring once again to FIG. 2, the explanation will be continued. The communication unit 170 transmits or receives data to or from an external apparatus or the like using wired connection or wireless connection. The payment unit 180 performs processing of paying for a product when product registration is completed. The payment unit 180 may include functions of a Point Of Sales (POS) terminal.

Referring next to flowcharts shown in FIGS. 11 and 12, processing performed in the payment system 1000 according to this example embodiment will be described.

Figure 11:
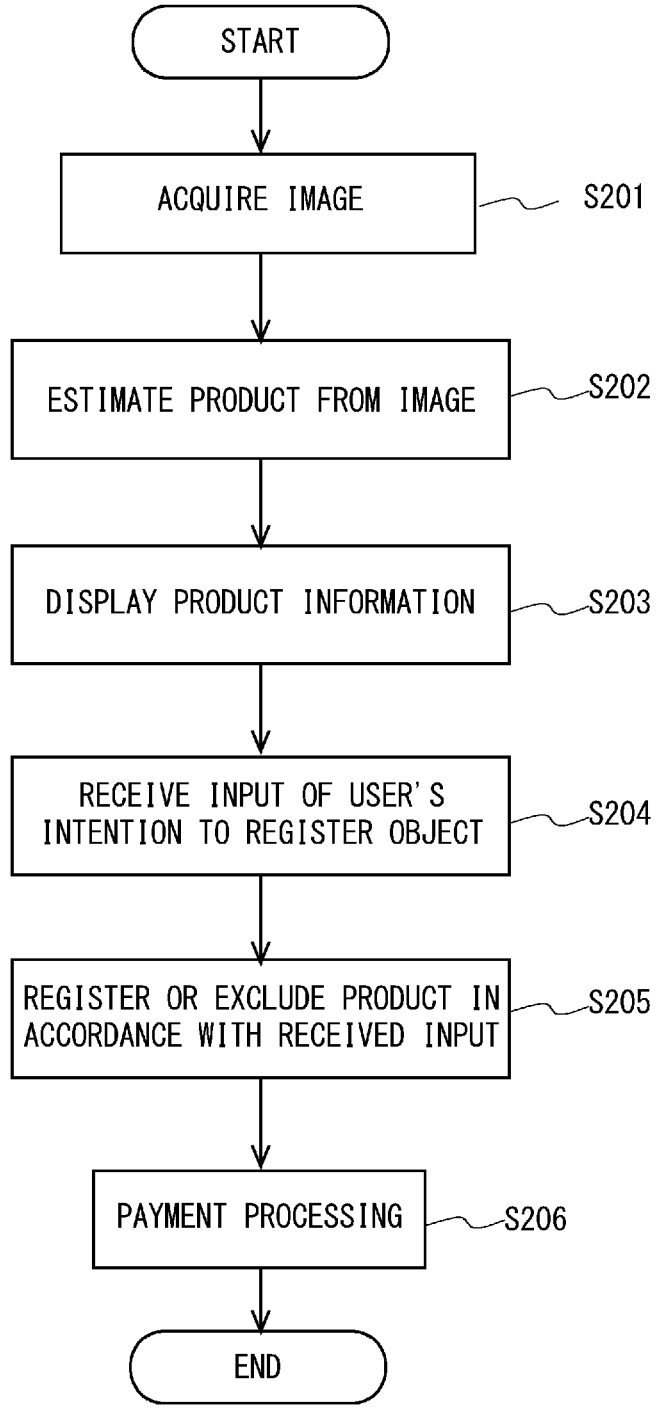
FIG. 11 is a flowchart showing processing performed by the payment system according to the second example embodiment.

FIG. 11 is a flowchart showing processing performed by the payment apparatus 100. First, the payment apparatus 100 acquires an image including a payment target product from the image-capturing apparatus 20 (S201). The payment apparatus 100 identifies an object from the acquired image and estimates the product that corresponds to the identified object (S202). The payment apparatus 100 displays the name of the estimated product in association with the image of the identified object in the product display region 131 (see FIG. 6) of the display unit 130 (S203).

Now, with reference to the flowchart shown in FIG. 12, processing of inputting the intention to register an object that the cashier, who is a user, performs will be described. First, the cashier checks the content displayed in the product display region 131, and determines whether the result of the estimation is incorrect (S301). When the result of the estimation is not incorrect (NO in S301), the process proceeds to the next processing.

When the result of the estimation is incorrect (YES in S301), the cashier determines whether the incorrectly estimated object is an object other than the products included in the menu prepared in the store (S302). When the incorrectly estimated object is included in the menu (NO in S302), the cashier operates the display unit 130 and selects the correct product (S303). When, for example, curry and rice is incorrectly estimated as hashed beef rice, the cashier touches and selects the image of this object in the product display region 131, and selects curry and rice from the product candidate list 133. Further, when, for example, water, which is a payment non-target product, is recognized as juice, which is a payment target product, the cashier presses the "0 yen" button of the index buttons 132. The cashier selects water from the displayed payment non-target product list 136 (see FIG. 7).

Figure 12:
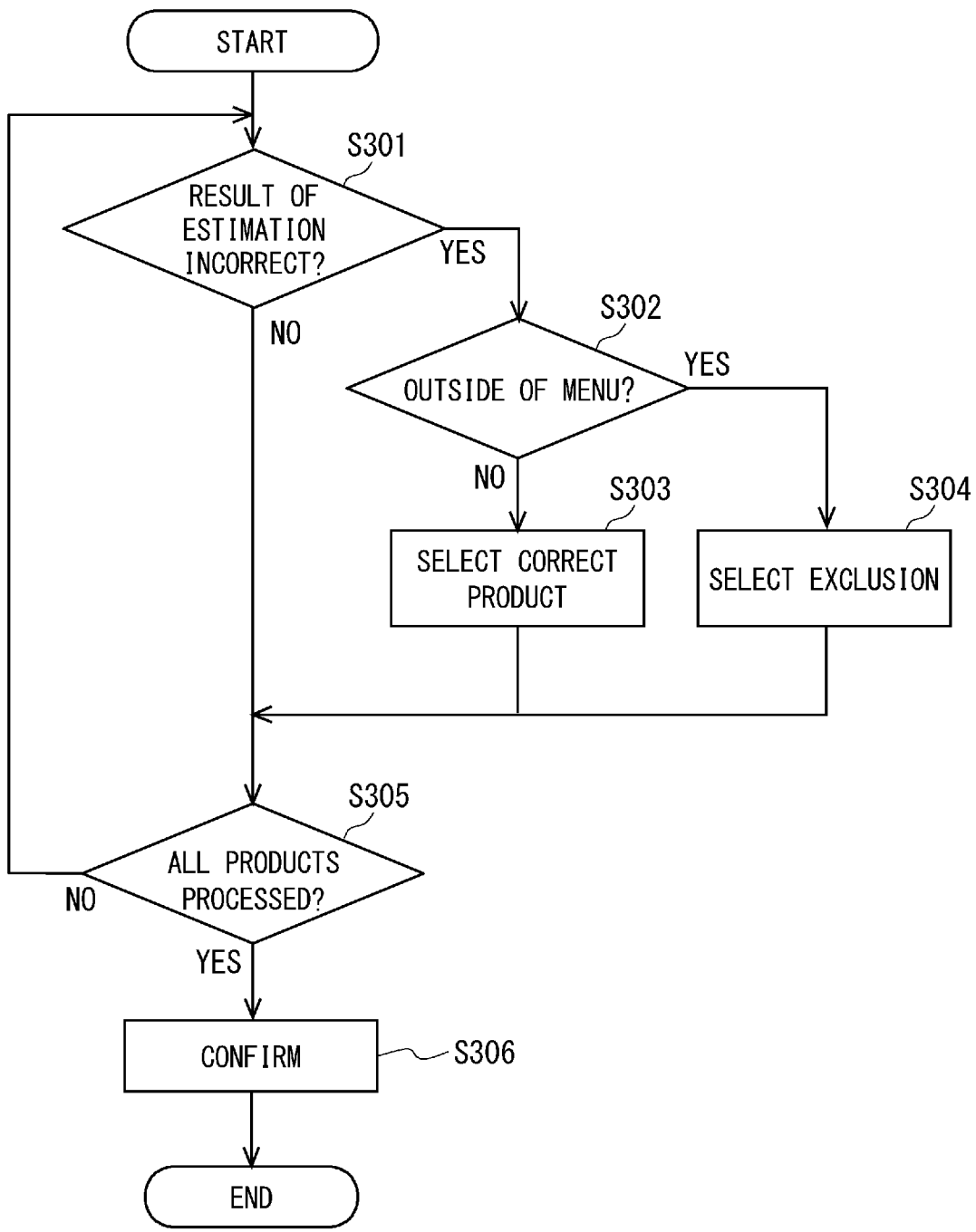
FIG. 12 is a flowchart showing processing performed by a user in the second example embodiment.

When the incorrectly estimated object is not included in the menu in the processing of S302 shown in FIG. 12 (YES in S302), the cashier inputs information indicating that this object should be excluded from the payment target products (S304). The cashier may cause the exclusion button 135 to be displayed by pressing the "0 yen" button of the index buttons 132 (see FIG. 7), press the exclusion button 135, and input information indicating that this object should be excluded. Further, when the exclusion button 135 has already been displayed, the cashier may input information indicating that this object should be excluded by pressing the exclusion button 135 without using the "0 yen" button. Further, the cashier may input information indicating that this object should be excluded by using various kinds of operations including long pressing, double tapping, or swiping of the image of the object to be excluded. In this manner, the cashier inputs the intention to register the recognized object to the payment apparatus 100.

The cashier determines whether the processing of confirming the result of the estimation for all the objects that have been recognized has been completed (S305). When there is a product that has not yet been processed (NO in S305), the process goes back to the step in S301, and similar processing is repeated until processing of all the objects is completed. When there is no product that has not yet been processed (YES in S305), the cashier presses the confirmation button 134 to confirm the content.

Referring once again to FIG. 11, the explanation will be continued. The payment apparatus 100 receives the cashier's intention to input as described above (S204). The payment apparatus 100 registers or excludes the recognized object in accordance with the received input (S205). When the payment apparatus 100 has received the input to register the recognized object as the payment target product, the payment apparatus 100 registers the object as the payment target product. When the input to exclude the recognized object from the payment target products has been received, the payment apparatus 100 does not register this object as the payment target product. In the example shown in FIG. 8, the payment apparatus 100 registers curry and rice as the payment target product and does not register smartphone as the payment target product. In this manner, the product that should be regarded as a payment target is correctly registered as a payment target product and the object that should be excluded from payment targets is excluded from the payment target products. The payment apparatus 100 performs payment processing (S206) and the process is ended.

As described above, according to the payment system according to this example embodiment, the cashier is able to easily know that customer's personal belongings have been incorrectly recognized as payment target products by checking the display in the product display region. Further, the cashier is able to easily exclude an incorrectly recognized object from the payment target products using the input region such as the exclusion button before the payment target product is confirmed. Further, the product display region is displayed while the positional relation among the products on the tray is maintained, whereby the cashier is able to perform intuitive operations for finding and correcting errors in the result of the estimation. According to this configuration, with the payment system according to this example embodiment, payment processing can be efficiently performed.

Third Example Embodiment

Next, a configuration of a payment system 1000 according to a third example embodiment will be described.

Figure 13:
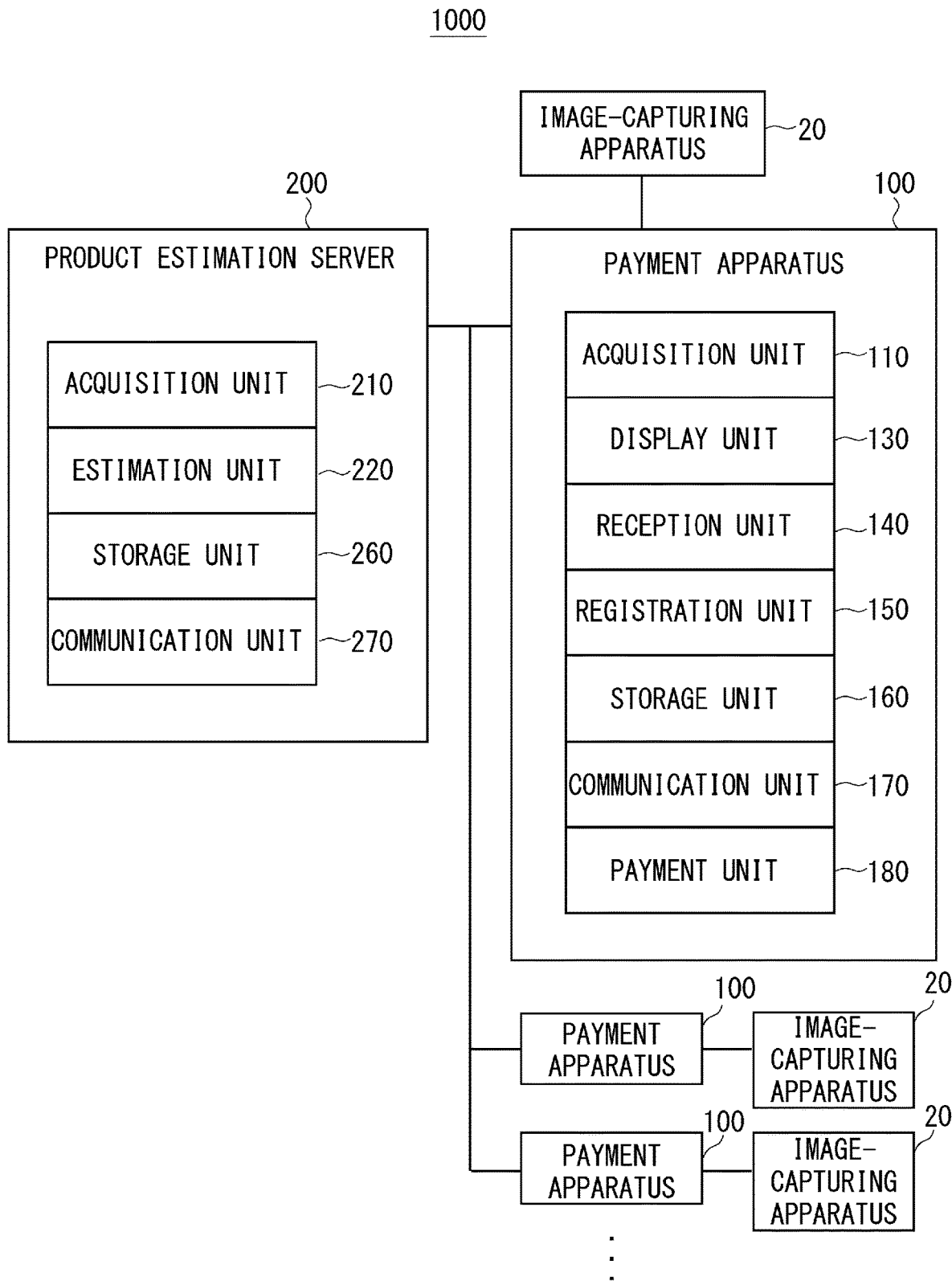
FIG. 13 is a block diagram showing a configuration of a payment system according to a third example embodiment.

FIG. 13 is a block diagram showing a configuration of the payment system 1000 according to this example embodiment. The payment system 1000 according to this example embodiment includes a payment apparatus 100, an image-capturing apparatus 20, and a product estimation server 200. In this example embodiment, unlike the processing in the second example embodiment, the product estimation processing is performed by the product estimation server 200, not by the payment apparatus 100. As shown in FIG. 13, a plurality of payment apparatuses 100 may be provided. The plurality of payment apparatuses 100 and the product estimation server 200 are connected to each other by a network such as the Internet and may transmit and receive data to and from each other.

The payment apparatus 100 includes an acquisition unit 110, a display unit 130, a reception unit 140, a registration unit 150, a storage unit 160, a communication unit 170, and a payment unit 180. Further, like in the second example embodiment, the payment apparatus 100 is connected to the image-capturing apparatus 20 that captures an image of a product group 30.

The acquisition unit 110 acquires an image of the product group 30 captured by the image-capturing apparatus 20 and transmits the acquired image to the product estimation server 200. The acquisition unit 110 acquires the result of the estimation from the product estimation server 200 and outputs the acquired result to the display unit 130.

The storage unit 160 stores product information. The storage unit 160 stores the product information database 161 as shown in FIG. 9. Unlike the operation in the second example embodiment, the storage unit 160 may not store the feature point information database 162 as shown in FIG. 10.

The communication unit 170 transmits and receives data to and from another payment apparatus 100 and the product estimation server 200 using wired connection or wireless connection.

Since the configurations other than those described above are similar to those in the second example embodiment, the descriptions thereof will be omitted.

The product estimation server 200 includes an acquisition unit 210, an estimation unit 220, a storage unit 260, and a communication unit 270.

The acquisition unit 210 acquires an image including the payment target product from the payment apparatus 100 and outputs the acquired image to the estimation unit 220.

The estimation unit 220 identifies the object from the image acquired in the acquisition unit 210, and estimates the product that corresponds to the identified object by referring to the feature point information database 162 stored in the storage unit 260. Since the method of the estimation processing is similar to that described with reference to FIG. 4 in the second example embodiment, the descriptions thereof will be omitted. The estimation unit 220 transmits the result of the estimation to the payment apparatus 100.

The storage unit 260 stores feature point information of products. The storage unit 260 stores the feature point information database 162 as shown in FIG. 10.

The communication unit 270 transmits and receives data to and from a plurality of payment apparatuses 100 using wired connection or wireless connection.

As described above, with the payment system 1000 according to this example embodiment, it is possible to obtain effects similar to those obtained in the second example embodiment. The product estimation server 200 may perform processing other than the processing of estimating products in place of the payment apparatus 100. For example, the product estimation server 200 may store the product information database 161 in place of the payment apparatus 100 and transmit necessary product information to the payment apparatus 100 in accordance with the request from the payment apparatus 100. Further, an apparatus other than the product estimation server 200 may further be provided and the processing performed by the payment apparatus 100 or the product estimation server 200 may be performed in a distributed manner.

<Hardware Configuration Example>

Each functional component unit of the payment apparatus 100 and the product estimation server 200 may be implemented by hardware (e.g., a hardwired electronic circuit or the like) that implements each functional component unit or may be implemented by a combination of hardware with software (e.g., a combination of an electronic circuit and a program that controls this electronic circuit). Hereinafter, a case in which each functional component unit of the payment apparatus 100 and the like is implemented by a combination of hardware with software will be further described.

Figure 14:
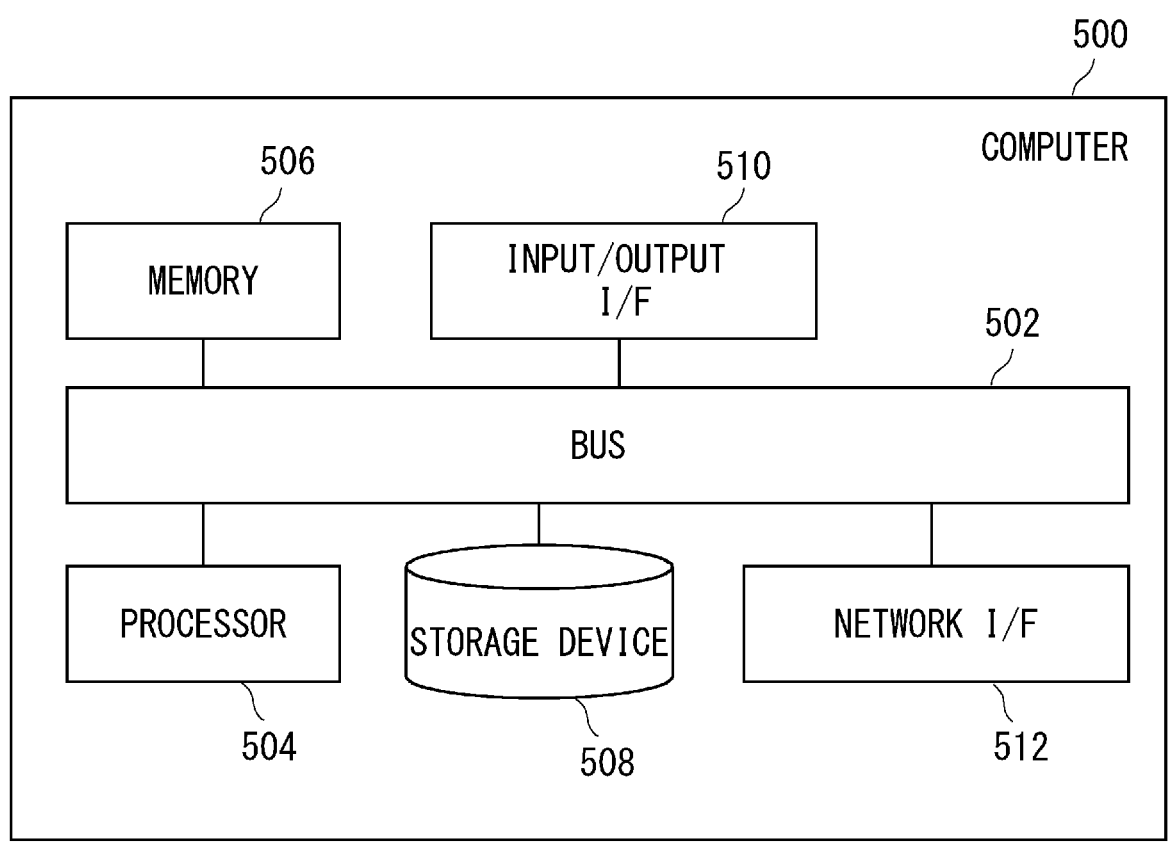
FIG. 14 is a diagram showing a hardware configuration example such as a payment system and the like according to example embodiments.

FIG. 14 is a block diagram illustrating a hardware configuration of a computer 500 that implements the payment apparatus 100 and the like. The computer 500 may be a dedicated computer designed to implement the payment apparatus 100 and the like or may be a general-purpose computer. The computer 500 may be a portable computer such as a smartphone or a tablet terminal.

For example, by installing a predetermined application into the computer 500, each function of the payment apparatus 100 and the like is implemented in the computer 500. The aforementioned application is formed of a program for implementing a functional component unit of the payment apparatus 100 and the like.

The computer 500 includes a bus 502, a processor 504, a memory 506, a storage device 508, an input/output interface 510, and a network interface 512. The bus 502 is a data transmission path for enabling the processor 504, the memory 506, the storage device 508, the input/output interface 510, and the network interface 512 to transmit or receive data to or from one another. However, the method of connecting the processor 504 and the like is not limited to bus connection.

The processor 504 may be various kinds of processors such as a Central Processing Unit (CPU), a Graphics Processing Unit (GPU), or a Field-Programmable Gate Array (FPGA). The memory 506 is a main memory unit that is implemented using a Random Access Memory (RAM) or the like. The storage device 508 is an auxiliary memory unit that is implemented using a hard disk, a Solid State Drive (SSD), a memory card, a Read Only Memory (ROM) or the like.

The input/output interface 510 is an interface for allowing the computer 500 and an input/output device to be connected to each other. For example, an input device such as a keyboard and/or an output device such as a display device is/are connected to the input/output interface 510.

The network interface 512 is an interface for allowing the computer 500 to be connected to a network. This network may be a Local Area Network (LAN) or may be a Wide Area Network (WAN).

The storage device 508 stores a program for implementing each functional component unit of the payment apparatus 100 (a program for implementing the aforementioned application). The processor 504 loads this program into the memory 506 and executes the loaded program, thereby implementing each functional component unit of the payment apparatus 100.

Each of the processors executes one or more programs including instructions for causing a computer to perform an algorithm. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), compact disc (CD), or digital versatile disk (DVD), and semiconductor memories (such as mask ROM, Programmable ROM (PROM), Erasable PROM (EPROM), flash ROM, RAM, etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the aforementioned example embodiments and may be changed as appropriate without departing from the spirit of the present disclosure. For example, while the casher in the store operates the payment apparatus 100 in the aforementioned description, this is merely one example. The payment apparatus 100 may be used as a self-checkout where customers perform their own checkout operations.

The payment system, the payment method, and the non-transitory computer readable medium according to the present disclosure are able to easily exclude incorrectly recognized objects from payment targets.

Each of the above-described embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A payment system comprising:
   at least one memory storing instructions; and
   at least one processor configured to execute the instructions to:
   acquire an image including a payment target product;
   identify an object from the image and estimate a product that corresponds to the identified object;
   display information on the estimated product in association with the object in a product display region;
   receive, from a user, input indicating intention to register the object, which indicates whether to register the object as the payment target product by an operation on a first input region for inputting information indicating that the object that has been correctly recognized should be registered as the payment target product or a second input region for inputting information indicating that the object that has been incorrectly recognized should be excluded from the payment target products; and
   register the object as the payment target product in accordance with the input indicating the intention to register the object, wherein
   when the object is registered, the object is registered as the payment target product when the input indicating that the object should be registered as the payment target product has been received, and the object is not registered as the payment target product when the input indicating that the object should be excluded from the payment target products has been received, and when the input indicating that the object should be excluded from the payment target products has been received, information indicating that the object has been excluded from the payment target products in proximity to an image of the object is displayed;
   wherein
   the at least one processor is further configured to:
   identify a plurality of objects from the image and estimate a plurality of products that correspond to the plurality of respective objects that have been identified;
   display information on the plurality of products that have been estimated in association with the plurality of respective objects in the product display region;
   receive input indicating the intention to register each of the plurality of objects from the user; and
   register each of the plurality of objects as the payment target product in accordance with the input indicating the intention to register the objects, wherein
   when the object is registered, one of the plurality of objects regarding which the input indicating that this object should be registered as the payment target product has been received is registered as the payment target product, and one of the plurality of objects regarding which the input indicating that this object should be excluded from the payment target products has been received is not registered as the payment target product, and when the plurality of objects include the object regarding which the input indicating that this object should be excluded from the payment target products has been received, information indicating that the object has been excluded from the payment target products in proximity to the image of the object is displayed; and
   wherein
   the payment system comprises a touch operation screen including a function of receiving the input indicating the intention to register an object, and
   the at least one processor is configured to:
   display the product display region and the second input region on the same screen; and
   receive the input indicating that the object should be excluded in accordance with the operation of touching the second input region by the user.

2. The payment system according to claim 1, wherein
   the payment system comprises a touch operation screen including a function of receiving the input indicating the intention to register the object,
   the at least one processor is configured to:
   display, in accordance with a first touch operation by the user, the product display region, a payment non-target product display region that displays information on a payment non-target product that may be estimated as the product, and the second input region on the same screen; and
   receive the input indicating that the object should be excluded in accordance with a second touch operation on the second input region by the user.

3. The payment system according to claim 1, wherein
   the product information includes the name of the product;
   the at least one processor is configured to display the name of the estimated product in association with an image of the object in the product display region, and
   the image of the object is displayed while a positional relation among the objects in the acquired image is maintained.

4. A payment method comprising:
   acquiring an image including a payment target product;
   identifying an object from the image and estimating a product that corresponds to the identified object;
   displaying information on the estimated product in association with the object in a product display region;
   receiving, from a user, input indicating intention to register the object, which indicates whether to register the object as the payment target product by an operation on a first input region for inputting information indicating that the object that has been correctly recognized should be registered as the payment target product or a second input region for inputting information indicating that the object that has been incorrectly recognized should be excluded from the payment target products;
   registering the object as the payment target product in accordance with the input indicating the intention to register the object, wherein
   when the object is registered, the object is registered as the payment target product when the input indicating that the object should be registered as the payment target product has been received, and the object is not registered as the payment target product when the input indicating that the object should be excluded from the payment target products has been received, and when the input indicating that the object should be excluded from the payment target products has been received, information indicating that the object has been excluded from the payment target products in proximity to an image of the object is displayed;

identifying a plurality of objects from the image and estimating a plurality of products that correspond to the plurality of respective objects that have been identified;

displaying information on the plurality of products that have been estimated in association with the plurality of respective objects in the product display region;

receiving input indicating the intention to register each of the plurality of objects from the user; and registering each of the plurality of objects as the payment target product in accordance with the input indicating the intention to register the objects, wherein when the object is registered, one of the plurality of objects regarding which the input indicating that this object should be registered as the payment target product has been received is registered as the payment target product, and one of the plurality of objects regarding which the input indicating that this object should be excluded from the payment target products has been received is not registered as the payment target product, and when the plurality of objects include the object regarding which the input indicating that this object should be excluded from the payment target products has been received, information indicating that the object has been excluded from the payment target products in proximity to the image of the object is displayed;

displaying the product display region and the second input region on a same screen; and receiving the input indicating that the object should be excluded in accordance with the operation of touching the second input region by the user.

5. A non-transitory computer readable medium storing a program for causing a computer to execute a payment method comprising:

acquiring an image including a payment target product;

identifying an object from the image and estimating a product that corresponds to the identified object;

displaying information on the estimated product in association with the object in a product display region;

receiving, from a user, input indicating intention to register the object, which indicates whether to register the object as the payment target product by an operation on a first input region for inputting information indicating that the object that has been correctly recognized should be registered as the payment target product or a second input region for inputting information indicating that the object that has been incorrectly recognized should be excluded from the payment target products; and registering the object as the payment target product in accordance with the input indicating the intention to register the object, wherein when the object is registered, the object is registered as the payment target product when the input indicating that the object should be registered as the payment target product has been received, and the object is not registered as the payment target product when the input indicating that the object should be excluded from the payment target products has been received, and when the input indicating that the object should be excluded from the payment target products has been received, information indicating that the object has been excluded from the payment target products in proximity to an image of the object is displayed;

identifying a plurality of objects from the image and estimating a plurality of products that correspond to the plurality of respective objects that have been identified;

displaying information on the plurality of products that have been estimated in association with the plurality of respective objects in the product display region;

receiving input indicating the intention to register each of the plurality of objects from the user; and registering each of the plurality of objects as the payment target product in accordance with the input indicating the intention to register the objects, wherein when the object is registered, one of the plurality of objects regarding which the input indicating that this object should be registered as the payment target product has been received is registered as the payment target product, and one of the plurality of objects regarding which the input indicating that this object should be excluded from the payment target products has been received is not registered as the payment target product, and when the plurality of objects include the object regarding which the input indicating that this object should be excluded from the payment target products has been received, information indicating that the object has been excluded from the payment target products in proximity to the image of the object is displayed; displaying the product display region and the second input region on a same screen; and receiving the input indicating that the object should be excluded in accordance with the operation of touching the second input region by the user.

* * * * *